United States Patent Office 2,995,540
Patented Aug. 8, 1961

2,995,540
STABILIZING POLYAMIDE FIBERS AGAINST ULTRAVIOLET RADIATION
Max Duennenberger, Birsfelden, Adolf Emil Siegrist, Basel, and Erwin Maeder, Munchenstein, Switzerland, assignors to Ciba Limited, Basel, Switzerland
No Drawing. Filed Oct. 13, 1959, Ser. No. 846,059
Claims priority, application Switzerland Oct. 14, 1958
10 Claims. (Cl. 260—45.8)

The present invention relates to the use of certain azole compounds providing useful protection against ultraviolet radiation. More specifically, the azole compounds are those in which two adjacent carbon atoms of the azole ring are simultaneously members of a benzene ring, and the carbon atom situated between the two hetero atoms of the azole ring is attached to a carbon atom of another benzene ring, which contains in the o-position in relation to the bound to the imidazole ring an optionally etherified hydroxy group.

By "azole ring" is meant a thiazole, imidazole or oxazole ring. The two vicinal carbon atoms of these rings are simultaneously members of a benzene ring. Benzthiazoles, benzimidazoles and benzoxazoles which are directly attached in the 2-position to a benzene ring further substituted in the manner indicated are therefore concerned. A number of azole compounds of this type are already known for example 2-(2'-hydroxyphenyl)-benzimidazole, 2-(2'-hydroxyphenyl)-benzoxazole and 2-(2'-hydroxyphenyl)-benzthiazole.

The azole compounds employed according to the invention as means for protection against ultra-violet radiation can be prepared by conventional methods known per se. The oxazole compounds may be obtained, for example, by heating o-aminohydroxy-benzenes containing primary amino groups with benzene-o-hydroxycarboxylic acids or their functional derivatives, for example ethers, preferably in the presence of agents for splitting off water. The procedure may be carried out in the absence of solvents or in the presence of organic solvents of high boiling point. As agent for splitting off water, there may be employed, for example, boric acid, which catalytically influences the reaction. It is particularly advantageous to carry out the reaction in an excess of polyphosphoric acid. This compound acts both as a solvent for the starting materials and end-products, and also as an agent for splitting off water.

It is also possible by these methods to prepare the corresponding imidazole compounds if, instead of o-aminohydroxyaryl compounds, there are employed as starting materials o-diamino-aryl compounds, of which one amino group is primary and the other primary or secondary. The imidazole compounds may also be obtained by heating such o-diamino-aryl-compounds and benzene-o-hydroxycarboxylic acids in aqueous mineral acid solutions, for example hydrochloric acid or sulfuric acid, in a closed vessel at temperatures of about 200° C.

The imidazole or oxazole compounds can also be prepared by heat-treatment and/or treatment with agents capable of splitting out water from acyl compounds derived on the one hand from benzene-o-hydroxycarboxylic acids and on the other hand from o-aminohydroxybenzenes containing a primary amino group or from o-diaminobenzenes of which one amino group is primary and the other amino group is primary or secondary. The acyl compounds employed as starting materials in such cases may be obtained by reacting the o-aminohydroxybenzene or o-diaminobenzene compounds with benzene-o-hydroxycarboxylic acid halides, preferably the acid chlorides. The splitting-off of water from the acyl compounds may be effected in the manner hereinbefore indicated for the reaction of o-diamino- and o-aminohydroxy aryl compounds with benzene-o-hydroxycarboxylic acids. Zinc chloride melt may be mentioned as a further agent which may be employed to split off water.

The azole compounds thus obtainable and the aforesaid starting materials may optionally contain further substituents. The o-aminohydroxyaryl and o-diaminoaryl compounds may contain as nuclear substituents, for example, alkyl or alkoxy groups of low molecular weight, more especially methyl or methoxy groups, chlorine atoms or phenyl radicals. Furthermore, one amino group of the o-diamines may carry one substituent, for example an alkyl, hydroxyalkyl, or benzyl group. As examples of suitable aminobenzene starting materials, the following compounds may be mentioned:

1-amino-2-hydroxybenzene,
1-amino-2-hydroxy-4(or 5)-methylbenzene,
1-amino-2-hydroxy-3:5-dimethylbenzene,
1-amino-2-hydroxy-5-t-butylbenzene,
1-amino-2-hydroxy-5-chlorobenzene,
1-amino-2-hydroxy-3:5-dichlorobenzene,
1:2-diaminobenzene,
1:2-diamino-4-methylbenzene,
1:2-diamino-4-chlorobenzene,
1:2-diamino-4-methoxybenzene,
1-amino-2-methylaminobenzene,
1-amino-2-β-hydroxyethylaminobenzene,
1-amino-2-benzylaminobenzene, and
1-amino-2-mercaptobenzene.

The benzene-o-hydroxycarboxylic acid starting materials, or their functional derivatives, may be free from or contain further substituents, for example, phenyl radicals or alkoxy groups of low molecular weight, such as methoxy or ethoxy groups, or preferably chlorine atoms, alkyl groups of low molecular weight, such as methyl or ethyl. As examples of the benzene-o-hydroxycarboxylic acids in question, the following may be mentioned: 2-hydroxy-benzene-1-carboxylic acid, 2-hydroxy-3-chlorobenzene-1-carboxylic acid, 2-hydroxy-3:5-dichlorobenzene-1-carboxylic acid, 2-hydroxy-3-methylbenzene-1-carboxylic acid, 2-hydroxy-3:5-dimethylbenzene-1-carboxylic acid, and 3-hydroxy-1:1'-diphenyl-4-carboxylic acid.

Compounds that have proved to be particularly valuable for the purpose of this invention are:

(A) Compounds of the formula (1)

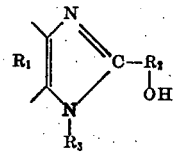

in which $R_1$ represents a radical of the benzene series fused in the aforesaid manner with the imidazole ring, $R_2$ represents a benzene radical, and $R_3$ represents a hydrogen atom or a substituent (for example a lower alkyl, lower hydroxyalkyl or aralkyl group), and the hydroxy group is in the o-position to the linkage with the imidazole ring; and more especially compounds of the formula (2)

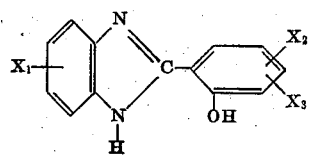

in which $X_1$ represents a hydrogen atom, a chlorine atom or a lower alkyl group, and $X_2$ and $X_3$ represent hydrogen atoms, chlorine atoms, lower alkyl or lower alkoxy groups.

(B) Compounds of the formula (3)

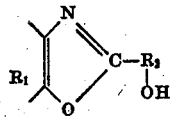

wherein the various symbols have the meanings assigned to them above and the hydroxy group is in the o-position, more especially compounds of the formula (4)

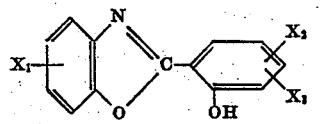

wherein the various symbols have the meanings assigned to them above.

The compounds employed in accordance with the invention, more especially those of the foregoing formulae 1 to 4, may as already stated, contain an ether group, for example a methoxy or ethoxy group, instead of the specified free hydroxy group.

In accordance with the present invention, the aforesaid azole compounds are employed for the purpose of enhancing the resistance of materials to, or protecting materials against the action of, ultraviolet radiation. Three main embodiments of the invention, which may be applied separately or in combination are:

(A) The azole is incorporated in a substrate with the object of protecting this substrate from the action of ultraviolet rays by preventing a modification of one or more of its physical properties, for example a discoloration, a modification of the breaking strength, embrittlement and/or chemical reactions induced by ultraviolet rays, such as oxidation processes. In this case, the incorporation may take place before or during the preparation of the substrate or subsequently by a suitable method, for example by a fixation method, similar to a dyeing process.

(B) The azole is incorporated in a substrate in order to protect one or more substances incorporated in the substrate, such as for example as dyes, while the substrate protection mentioned under (A) may occur simultaneously.

(C) The azole is introduced into a "filter" or barrier layer or its equivalent with the object of protecting a material (e.g. a material positioned in a shop window) against the action of ultraviolet rays by positioning the filter between said material and the source of said rays. The filter or barrier may be a solid (in the form of a film, foil or dressing) or a plastic or liquid (for example, a cream, oil or wax).

As materials which may be protected according to the invention there may be mentioned:

(a) Textile materials in general, which may be present in any desired form, for example as fibers, filaments, yarns, woven or knitted articles or as felt, and all products prepared therefrom; such textile materials may consist of natural materials of animal origin, such as wool and silk, or of vegetable origin, such as cellulose materials from cotton, hemp, flax, lint, jute and ramie, as also of semi-synthetic materials, such as regenerated cellulose, for example rayon, viscose, including staple fiber or synthetic materials which are obtainable by polymerization or copolymerization, for example polyacrylonitrile, or those obtainable by polycondensation, such as polyesters and especially polyamides. It is desirable in the case of semi-synthetic materials to add the azole to the spinning dope for example viscose or acetylcellulose (including cellulose triacetate) dope, and in the case of compositions intended for the preparation of fully synthetic fibers, such as polyamide or polyacrylonitrile, to introduce the azole before, during or after the polycondensation or polymerization.

(b) Fibrous materials of other kinds, which are not textile materials and which may be of animal origin, such as feathers, hair, skins and hides, and leather obtained from the latter by natural or chemical tanning, as also products manufactured therefrom, and in addition those of vegetable origin, such as straw, wood, wood pulp or fibrous materials consisting of compacted fibers, such as paper, board or laminated wood, and materials produced from the latter, as also paper pulp (for example as derived from the beater employed for the production of paper).

(c) Coating and dressing agents for textiles and paper, for example based on starch or casein, or based on synthetic resin, for example vinyl acetate or acrylic acid derivatives.

(d) Lacquers and films of various compositions, for example those of acetylcellulose, cellulose propionate, cellulose butyrate and cellulose mixtures, such for example as cellulose acetate butyrate and cellulose acetate propionate, and in addition nitrocellulose, vinyl acetate, polyvinyl chloride, copolymers of vinyl chloride and vinylidene chloride, alkyd resins, polyethylenes, polyamides, polyacrylonitrile and polyesters. A particularly important application for the said azole compounds is their incorporation in packaging materials, more especially the known transparent foils consisting of regenerated cellulose (viscose) or acetyl cellulose. In such cases, it is generally desirable to add the azole to the mass from which these foils are to be produced.

(e) Natural or synthetic resins, for example epoxy resins, polyester resins, vinyl resins, polystyrene resins, alkyd resins, aldehyde resins, such as phenol, urea- or melamine-formaldehyde condensation products, as also emulsions of synthetic resins (for example oil in water or water in oil emulsions). In these cases, the azole may conveniently be introduced before or during the polymerization or polycondensation. In addition, synthetic resins reinforced with glass fibers, and laminates produced therefrom, may be mentioned.

(f) Hydrophobic materials containing oil, fat or wax, such as candles, floor polishes, floor stains or other wood stains, and furniture polishes, more especially those intended for the treatment of bright or bleached wood surfaces.

(g) Natural elastomeric materials such as rubber, balata, gutta-percha or synthetic vulcanizable materials, such as polychloroprene, olefinic polysulfides, polybutadiene or butadienestyrene copolymers (for example Buna S) or butadiene-acrylonitrile (for example Buna N), which may also contain fillers, pigments, and vulcanisation accelerators. The addition of the azole compounds according to the invention delays ageing and consequently prevents modification of the plastic properties and embrittlement.

(h) Cosmetic preparations, such as perfumes and colored and uncolored soaps and bath additives, skin and face creams, powders, repellants and more especially oils and creams for protection against the sun. Use of the azole compounds is indicated when, in addition to the harmful action of rays having a wavelength of 280 to 320 m$\mu$, which produce reddening of the skin, it is desired to reduce the browning or tan produced by ultraviolet rays of higher wavelength (up to about 400 m$\mu$).

(i) For the production of filter layers for photographic purposes, more especially for color photography.

It will be understood that the azoles are suitable not only for uncolored materials, but also for colored or pigmented materials. In such cases, the light protection is conferred upon the dyestuffs, whereby a very considerable improvement in the light fastness is effected in some cases. If desired, the treatment with the azole and the coloring or pigmenting process may be combined.

Depending upon the material to be treated, the requirements as to activity and the durability and other factors, the quantities of azole to be incorporated in the materials concerned may vary within fairly wide limits, for example from about 0.1% to 10%, preferably from 0.1% to 2%, by weight of the material which is to be directly protected against ultra-violet radiation.

In the following examples, unless otherwise stated, the parts and percentages are by weight, the temperatures are in degrees Centigrade, the melting points are uncorrected and the ultra-violet absorption spectra were measured in alcohol.

Example 1

10,000 parts of a polyamide in the form of chips or cuttings, prepared in known manner from hexamethylenediamine adipate or from ε-caprolactam, are mixed for 12 hours in an agitator with 30 parts of titanium dioxide (rutile) and 10 parts of the azole compound of the formula (5)
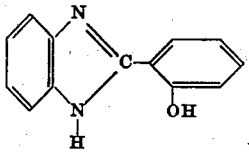

The chips or cuttings thus treated are melted by superheated steam in a vessel heated at 300° to 310° with oil or diphenyl steam, after displacement of the oxygen of the air, and are stirred for half an hour. The melt is thereafter extruded through a spinneret under a nitrogen pressure of 5 atmospheres gauge, and the cooled filament thus spun is wound onto a bobbin.

When the filaments thus obtained are stretched and thereafter exposed for 72 hours to the radiation from an "osram" xenon high-pressure lamp, their breaking strength decreases from 100% to 90%. If the compound of Formula 5 is not added to the polyamide spinning mass the breaking strength decreases from 100% to 67%.

The compound of Formula 5 may be prepared as follows:

43.2 parts of 1:2-diaminobenzene, 55.2 parts of 2-hydroxybenzoic acid and 300 parts of polyphosphoric acid are stirred for 4 hours at 245° to 250° in the absence of air. The product is then discharged into 1500 parts of water, the precipitated product is suction-filtered and the filter residue is thereafter stirred at 60° with 500 parts of water which has been made alkaline with ammonia. After 30 minutes, the mixture is cooled to room temperature, suction-filtered and dried. The compound of Formula 5, recrystallized from a mixture of dimethylformamide and water, melts at 230° to 240°. Its properties are the same as those of the compound described in the literature.

Instead of the compound of Formula 5, compounds of Formulae 6 to 14, the preparation of which will hereinafter be described, may be employed in the manner indicated as light protection agents for polyamide fibers.

(a) If, in the foregoing procedure, the 2-hydroxybenzoic acid is replaced by 52 parts of 2-hydroxy-3-chlorobenzoic acid, the compound of the formula (6)
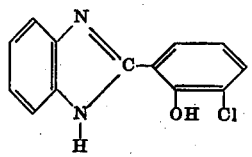

is obtained.

Yield: approximately 65 to 70 parts. The analytical sample on recrystallization from alcohol melts at 315° to 315.5° and gives the following data:

C₁₃H₉OClN₂ calculated: C, 63.81; H, 3.71; N, 11.45. Found: C, 63.48; H, 3.88; N, 1123.

λ max.=319 mμ (ε=19900); 332 mμ (ε=19300).

(b) If the 2-hydroxybenzoic acid is replaced by 88 parts of 2-hydroxy-3:5-dichlorobenzoic acid methyl ester, from 70 to 75 parts of the compound of formula (7)
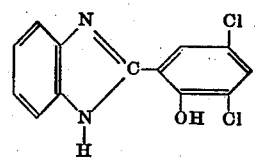

are obtained. The analytical sample recrystallized from alcohol melts at 308° to 309° and gives the following data:

C₁₃H₈OCl₂N₂ calculated: C, 55.94; H, 2.89; N, 10.04. Found: C, 55.38; H, 2.92; N, 10.09.

λ max.=329 mμ (ε=13350); 343 mμ (ε=13100).

(c) 5.45 parts of 1-hydroxy-2-aminobenzene and 8.65 parts of 2-hydroxy-3-chlorobenzoic acid are stirred with 150 parts of polyphosphoric acid for 4 hours at 200° in the absence of air. The mixture is then discharged into 400 parts of water, the precipitated product is suction-filtered and dried. There are thus obtained about 8 parts of the compound of formula (8)
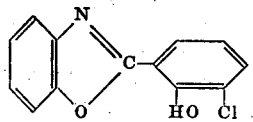

The analytical product twice recrystallized from alcohol melts at 136° to 136.5° and gives the following analytical data:

C₁₃H₈O₂ClN calculated: C, 63.54; H, 3.28; N, 5.70. Found: C, 63.40; H, 3.13; N, 5.79.

λ max.=322 mμ (ε=15500); 334 mμ (ε=14100).

(d) If, in the foregoing procedure (c), 10.2 parts of 2-hydroxy-3:5-dichlorobenzoic acid methyl ester are employed instead of 8.65 parts of 2-hydroxy-3-chlorobenzoic acid, there is obtained the compound of the formula:

(9)
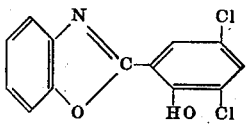

which melts at 186° to 187° and gives the following analytical data:

C₁₃H₇O₂Cl₂N calculated: C, 55.74; H, 2.52; N, 5.00. Found: C, 55.73; H, 2.70; N, 4.93.

λ max.=303 mμ (ε=20100), 333 mμ (ε=13500); 344 mμ (ε=12850).

(e) 12.3 parts of 1-hydroxy-2-amino-4-methylbenzene, 17.3 parts of 2-hydroxy-3-chlorobenzoic acid and 200 parts of polyphosphoric acid are stirred for 4 hours at 220° to 230° in the absence of air. The product is then discharged into 500 parts of water, suction-filtered and dried. There are thus obtained approximately 21 parts of the compound of formula:

(10)
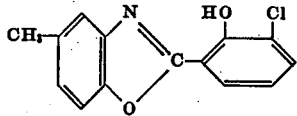

An analytical sample recrystallized three times from dimethylformamide melts at 151.7 to 152.5° and gives the following data:

C₁₄H₁₀O₂ClN calculated: C, 64.75; H, 3.88; N, 5.39. Found: C, 64.80; H, 3.73; N, 5.85.

λ max.=330 mμ (ε=17000); 343 mμ (ε=15700).

(f) If in the above procedure (e), 20.7 parts of 2 hydroxy-3:5-dichlorobenzoic acid are employed instead of 2-hydroxy-3-chlorobenzoic acid, the product of the formula:

(11) 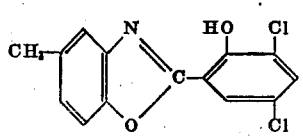

is obtained in good yield.

An analytical sample recrystallized from dimethylformamide melts at 161.8° to 162.3° and gives the following data:

$C_{14}H_9O_2Cl_2N$ calculated: C, 57.16; H, 3.08; N, 4.76. Found: C, 57.28; H, 2.96; N, 4.79.

λ max.=308 mμ (ε=14500); 334 mμ (ε=15700); 347 mμ (ε=15200).

(g) 14.5 parts of 1-hydroxy-2-amino-4-chlorobenzene and 13.8 parts of 2-hydroxy-benzoic acid are stirred with 200 parts of polyphosphoric acid for 3½ hours at 230° to 235° in the absence of air. The reaction mixture is then discharged into 500 parts of water, suction-filtered and dried. Yield approximately 23 parts of the compound of the formula

(12) 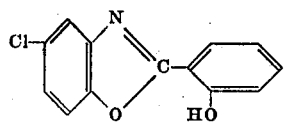

An analytical sample recrystallized three times from alcohol melts at 145.5° to 146.5° and gives the following data:

$C_{13}H_8O_2ClN$ calculated: C, 63.54; H, 3.28; N, 5.70. Found: C, 63.0; H, 3.28; N, 5.90.

λ max.=323 mμ (ε=19100); 334 mμ (ε=17100).

(h) If in the above procedure (g), 17.5 parts of 2-hydroxy-3-chlorobenzoic acid are employed instead of 2-hydroxybenzoic acid, the compound of the formula

(13) 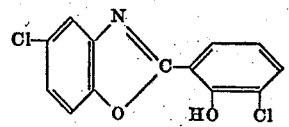

is obtained in good yield as condensation product. An analytical sample recrystallized three times from a mixture of dimethylformamide and water melts at 158° to 158.4° and gives the following analytical values:

$C_{13}H_7O_2Cl_2N$ calculated: C, 55.74; H, 2.52; N, 5.00. Found: C, 55.64; H, 2.47; N, 5.11.

λ max.=333 mμ (ε=15800); 343 mμ (ε=14800).

(i) If in the above procedure (g), 20.7 parts of 2-hydroxy-3:5-dichlorobenzoic acid are employed instead of 2-hydroxybenzoic acid, approximately 26 parts of the compound of the formula:

(14) 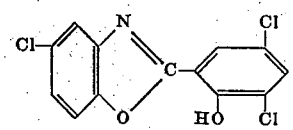

are obtained. A sample recrystallized four times from dimethylformamide melts at 204.5° to 205.5° and gives the following analytical data:

$C_{13}H_6O_2Cl_3N$ calculated: C, 49.63; H, 1.93; N, 4.45. Found: C, 49.52; H, 1.88; N, 4.66.

λ max.=309 mμ (ε=15150); 336 mμ (ε=13600); 346 mμ (ε=13300).

The following Compounds 15 to 29a and 35a may also be employed as light protection agents for polyamide fibers and the preparation of these compounds can be effected by a similar method as already described in Example 1 with reference to the preparation of Compound 5.

| Compound | Melting point | Analysis Calculated | Analysis Found | λ max/ε |
|---|---|---|---|---|
| (15) | 118.8–119.3 | C, 79.43; H, 4.56; N, 4.88 | C, 79.46; H, 4.74; N, 4.93 | 326/24,200; 338/20,900 |
| (16) | 264–264.6 | C, 39.68; H, 1.28; N, 3.56 | C, 39.64; H, 1.57; N, 3.45 | 339/12,000 |
| (17) | 140.3–141.4 | C, 75.30; H, 5.48; N, 5.85 | C, 75.22; H, 5.40; N, 5.74 | 300/18,100; 323/17,000; 335/15,100 |
| (18) | 154–155 | C, 53.82; H, 2.78; N, 4.83 | C, 53.61; H, 2.64; N, 4.71 | 330/14,800; 341/13,400 |
| (19) | 197.3–198.2 | C, 42.31; H, 1.91; N, 3.80 | C, 42.1; H, 2.03; N, 3.71 | 305/13,400; 347/7,100 |
| (20) | 209–210 | C, 38.70; H, 1.49; N, 3.47 | C, 38.98; H, 1.45; N, 3.43 | 303/11,600; 334/8,100; 346/8,000 |

| Compound | Melting point | Analysis | | λ max/ε |
|---|---|---|---|---|
| | | Calculated | Found | |
| (21) 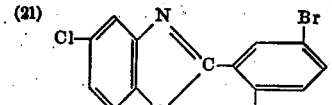 | 170.2–171.4 | C, 48.11<br>H, 2.71<br>N, 4.32 | C, 48.40<br>H, 2.30<br>N, 4.24 | 303/13,400<br>333/15,600<br>344/14,800 |
| (22) 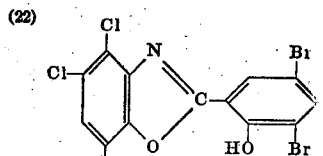 | 291.4–292 | C, 33.05<br>H, 0.85<br>N, 2.97 | C, 33.25<br>H, 0.83<br>N, 3.02 | 338/6,100<br>437/11,400 |
| (23) 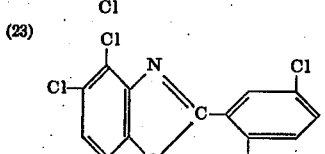 | 264.6–265.4 | C, 44.74<br>H, 1.44<br>N, 4.01 | C, 45.03<br>H, 1.69<br>N, 4.04 | 285/15,400<br>337/13,100 |
| (24) 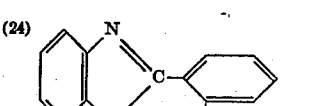 | 129.6–130.2 | C, 68.70<br>H, 3.99<br>N, 6.16 | C, 68.79<br>H, 3.88<br>N, 6.03 | 287/14,500<br>332/17,400 |
| (25) 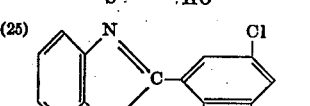 | 186–187 | C, 52.72<br>H, 2.38<br>N, 4.73 | C, 53.01<br>H, 2.35<br>N, 4.54 | 291/9,500<br>304/8,600<br>318/5,800 |
| (26) 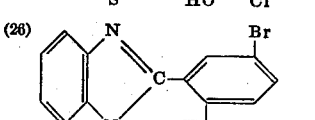 | 292–292.6 | C, 54.00<br>H, 3.14<br>N, 9.69 | C, 53.87<br>H, 3.17<br>N, 9.64 | 325/37,200<br>339/36,200 |
| (27) 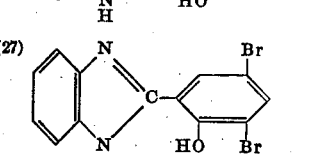 | 270.4–271 | C, 42.42<br>H, 2.19<br>N, 7.61 | C, 42.55<br>H, 2.15<br>N, 7.50 | 330/17,600<br>344/18,200 |
| (28) 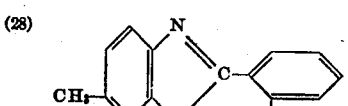 | 258–259 | C, 74.99<br>H, 5.38<br>N, 12.49 | C, 74.67<br>H, 5.32<br>N, 12.25 | 323/17,000<br>335/15,100 |
| (29) 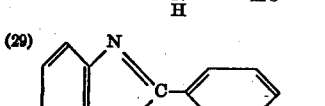 | 166–166.6 | C, 74.99<br>H, 5.38<br>N, 12.43 | C, 75.06<br>H, 5.17<br>N, 12.52 | 289/13,000 |
| (29a) 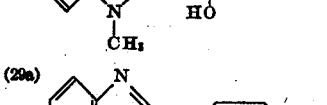 | 123.5–123.8 | C, 73.75<br>H, 4.33<br>N, 6.22 | C, 73.92<br>H, 4.30<br>N, 6.63 | 292/21,700<br>319/18,400<br>330/16,100 |
| (35a) 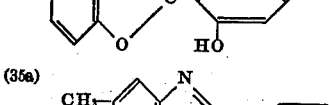 | 131–132 | C, 74.65<br>H, 4.92<br>N, 6.22 | C, 74.72<br>H, 5.09<br>N, 6.38 | 320/19,200<br>334/16,950 |

The following Compounds 30 to 36 and Compound 35a may also be employed as light protection agents for polyamide fibers.

Compound 30 of the following formula and analytical data (30)

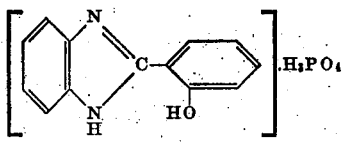

λ max.₁=318 mμ (ε=21800), λ max.₂=333 mμ (ε=21100), is prepared in the following manner:

21 parts of 2-(2'-hydroxyphenyl)-benzimidazole of formula (5) are dissolved in 150 parts of 10% sodium hydroxide solution and precipitated at 50° with 85% o-phosphoric acid. The product is stirred for 1 hour at the same temperature, cooled to room temperature, suction-filtered and washed with 300 parts of water. 30 parts of the compound of Formula 30 are thus obtained.

Compound 30a is prepared as follows:

31 parts of the compound of Formula 30 are stirred in 150 parts of water for 1 hour, the pH value being maintained between 7.2 and 7.3 with ammonia. The mixture is suction-filtered and washed with 50 parts of water, and approximately 25 parts of the compound of the following formula are obtained.

(30a)

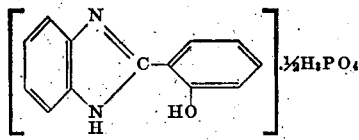

Compound 31 of the following formula and analytic data:

(31)

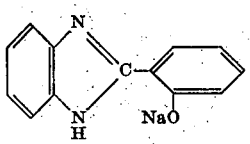

λ max.₁=317 mμ (ε=20800),
λ max.₂=330 mμ (ε=19400), can be prepared in the following manner: 42 parts of the compound of Formula 5 are heated at 100° in 250 parts of water containing 8 parts of sodium hydroxide solution. A clear solution is formed which is thereafter dried in vacuo at 60°. There are thus obtained 46 parts of the compound of Formula 31.

Compound 32 of the following formula and analytical data:

(32)

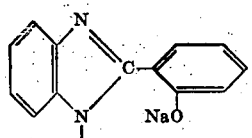

λ max.₁=297 mμ (ε=19300),
λ max.₂=350 mμ (ε=14100), is prepared in the following manner: 21 parts of the compound of Formula 5 are dissolved in 50 parts of methanol containing 8 parts of sodium hydroxide, and thereafter dried in vacuo at 60°. There are thus obtained 25 parts of Compound 32.

If, in the foregoing description of the preparation of Compound 32, the compound of Formula 5 is replaced by the corresponding quantity of the compound of Formula 7, 32 parts are obtained of the following compound:

(33)

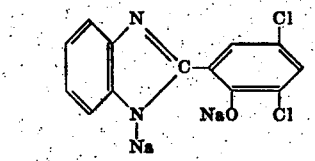

λ max.₁=304 mμ (ε=15600),
λ max.₂=368 mμ (ε=14800).

If, in the forgoing description of the preparation of Compound 33, the compound of Formula 5 is replaced by the corresponding quantity of the compound of Formula 26, there are obtained 33 parts of Compound 34, having the following formula (34)

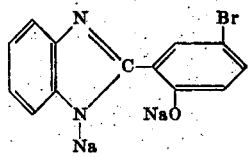

λ max.₁=290 mμ (ε=28600),
λ max.₂=365 mμ (ε=33800),

Compound 35 of the formula (35)

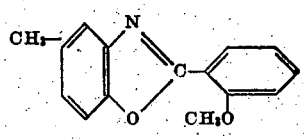

may be prepared as follows:

4.5 parts of the compound of Formula 35a are dissolved in 20 parts of glycol monomethyl ether and 25 parts of water containing 0.5 part of sodium hydroxide, whereafter 6 parts of dimethylsulfate are added drop-by-drop at 100° during one hour. The stirring is continued for one further hour, 200 parts of water are added and the precipitated product of Formula 35 is recovered by removal of the solvent on a suction filter.

After recrystallization five times from a mixture of dimethylformamide and water, an analytical sample melts at 92.4° to 92.6° and gives the following data:

$C_{15}H_{13}O_2N$ calculated: C, 75.30; H, 5.48; N, 5.85. Found: C, 75.57; H, 5.35; N, 5.96.

λ max.=318mμ (ε=17400).

Compound 36 of the formula (36)

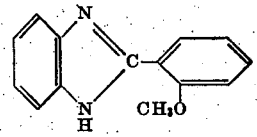

is prepared in the following manner:

7.6 parts of 2-methoxybenzoic acid and 5.4 parts of 1,2-diaminobenzene are stirred with 100 parts of polyphosphoric acid for 3 hours at 130° to 135°. After the working up in the usual manner, 8 parts of Compound 36 are obtained.

An analytical sample twice recrystallized from a mixture of dimethylformamide and water melts at 181° to 181.4° and gives the following data:

$C_{14}H_{12}ON_2$ calculated: C, 74.99; H, 5.38; N, 12.49. Found: C, 74.78; H, 5.48; N, 12.41.

λ max.=313 mμ(ε=24500).

*Example 2*

There is prepared in a beater a paper mass consisting of 150 parts of bleached cellulose sulfit, 7½ parts of china clay, 6 parts of aluminum sulfate, 3 parts of the sulfonation product of the dye of the formula

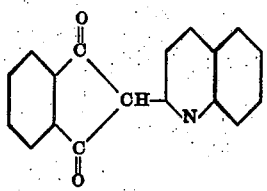

and about 5000 parts of water.

The paper prepared from this mass is coated at room temperature with a coating mass consisting of 900 parts of a mixture of 28% of polyvinyl acetate, 2% of an anhydrous emulsifier, 70% of water and 10 parts of the azole of Formula 30 prepared in accordance with Example 1, in solution in 90 parts of water, and the coated paper is dried at 50° to 60°.

The paper obtained exhibits after exposure on the fadeometer a fastness to light which is about 1½ points higher than that of a paper prepared without the addition of the azole.

Example 3

50 parts of a vinyl resin lacquer consisting of 240.4 parts of a stabilized polyvinyl chloride (for example 228 parts of "Vinylite VMCH" of Union Carbide and Carbon Corp., stabilized with 12.4 parts of "Stabilizer No. 52" of Advance Solvents) and 24.6 parts of dioctylphthalate, 367.5 parts of methylethyl ketone and 367.5 parts of toluene are mixed at room temperature for 10 minutes with a solution of 0.133 part of copper phthalocyanine tetramethoxypropylsulfamide, 0.133 part of the azole of Formula 12, obtainable in accordance with Example 1, in 11.5 parts of acetone.

A tin foil is coated with an 0.2 mm. thick, wet film thereof with the aid of a film drawing apparatus and thereafter dried at 120° for 5 minutes. There is drawn over the film thus treated, after cooling, a second film of the same thickness and having the same composition except that it does not contain the aforesaid dyestuff. The article is thereafter dried at 120° for 5 minutes. The blue-colored two-layer lacquer film thus obtained exhibits after exposure on the fadeometer a fastness to light which is about 1½ points higher than that of a lacquer film not containing the light protection agent of Formula 12.

If one of the compounds 6 to 16 and 18 to 23 is employed instead of the compound of Formula 12, equally favorable results are obtained.

Example 4

0.01 part of a paste consisting of 50 parts of the azo pigment of the formula

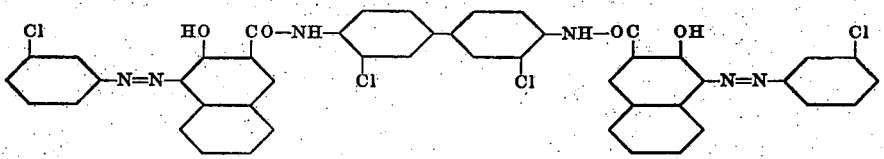

and 50 parts of dioctylphthalate, triturated on a three-roller mill, 0.10 part of the azole of Formula 12, obtained in accordance with Example 1, 13.00 parts of stabilized polyvinyl chloride and 7.00 parts of dioctylphthalate are well mixed and gellated on a calender at 145° to 150° for 5 minutes. The foil obtained exhibits after exposure on the fadeometer a fastness to light which is higher by at least 1 point than that of a foil not containing the azole of Formula 12.

If one of the Compounds 6 to 16 and 18 to 23 is employed instead of the compound of Formula 12 equally good results are obtained.

Example 5

A film approximately 40μ thick is prepared from a 10% acetylcellulose solution in acetone containing 1% of Compound 35, obtained in accordance with Example 1, calculated on the acetylcellulose. After drying, a portion of the film obtained is exposed for 1 hour on a fadeometer. The following values are obtained for the percentage permeability:

| Wavelength in mμ | Permeability to light in percent | |
| --- | --- | --- |
| | Exposed | Unexposed |
| 270–340 | 0 | 0 |
| 350 | 65 | 65 |
| 360 | 90 | 90 |

If Compound 35 of Example 1 is replaced in Example 5 by Compound 36 of Example 1, similar values are obtained.

Example 6

A polyvinyl chloride foil 0.2 mm. thick, containing 0.25% of the Compound 36 obtained in accordance with Example 1, is exposed for 50 hours on a fadeometer. The following values are obtained for the percentage permeability:

| Wavelength in mμ | Permeability to light in percent | |
| --- | --- | --- |
| | Exposed | Unexposed |
| 270–330 | 0 | 0 |
| 340 | 2 | 2 |
| 350 | 35 | 38 |
| 360 | 60 | 63 |
| 380 | 75 | 78 |

If, in Example 6, Compound 36 of Example 1 is replaced by Compound 35 of Example 1, similar values are obtained.

Example 7

5 parts of the compound of Formula 5, 10 parts of adipic acid isopropyltetrahydrofurfuryl ester and 1 part of glycerin monostearate are dissolved in 84 parts of ethyl alcohol. A solution is obtained which affords protection against sunlight and which repels insects, being excellently suitable for topical application to exposed parts of the body requiring such protection.

Instead of Compound 5, one of Compounds 20a, 34, 35 or 36 may be employed with similar su‑‑‑‑‑

Example 8

4 parts of the compound of Formula 5 are dissolved in 96 parts of ethyl alcohol, and 0.5 part of perfume oils is added. 40 parts of the solution thus obtained are transferred into a pressure vessel provided with a valve, together with 60 parts of a mixture of equal parts of trichloromonofluoromethane and dichlorodifluoromethane. An aerosol spray is thus obtained, which can be used as an agent for protection against the sun.

Instead of Compound 5, one of Compounds 29a, 34, 35 or 36 may be employed with similar success.

Example 9

10 parts of adipic acid isopropyltetrahydrofurfuryl ester, 5 parts of benzoic acid diethylamide, 8 parts of phthalic acid dimethyl ester and 5 parts of the compound of Formula 5 are dissolved in 36 parts of peanut oil and 36 parts of paraffin oil. A sun protection medium having an insect-repelling effect is obtained.

Instead of Compound 5, one of Compounds 29a, 34, 35 or 36 may be employed with corresponding success.

Example 10

4 parts of the compound of Formula 5, 10 parts of glycerin monostearate, 4 parts of cetyl alcohol, 1 part of sodium cetyl sulfate, 1 part of stearic acid and 5 parts of glycerin are intimately mixed together and emulsified in 75 parts of water. An emulsion is obtained, which is very suitable as a non-greasy hair cream and which protects the treated parts against the sun rays.

Instead of Compound 5, one of Compounds 29a, 34, 35 or 36 may be employed with similar success.

Example 11

5 parts of adipic acid isopropyltetrahydrofurfuryl ester, 5 parts of N,N-diethyl toluamide, 3 parts of the compound of Formula 5, 6 parts of cetyl alcohol, 14 parts of Vaseline oil, 10 parts of white beeswax, 14 parts of lanolin, 3 parts of cocoa butter, 39.7 parts of water and 0.3 part of sodium benzoate are intimately mixed to give an insect-repelling sun-protection cream having an excellent action.

Instead of Compound 5, one of Compounds 29a, 34, 35 or 36 may be employed with similar success.

What is claimed is:

1. Process for protecting polyamide fibers against ultraviolet radiation with enhancement of resistance to loss in breaking strength of such fibers, which comprises incorporating with the polyamide before the shaping procedure a compound of the formula

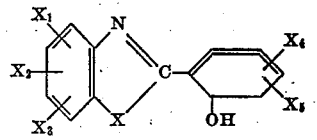

wherein X is a member selected from the group consisting of an oxygen atom, a sulfur atom and the —NH— group, $X_1$ is a member selected from the group consisting of a hydrogen atom, a chlorine atom and a lower alkyl radical, $X_2$ and $X_3$ each represent a member selected from the group consisting of a hydrogen atom and a chlorine atom, $X_4$ is a member selected from the group consisting of a hydrogen atom, a chlorine atom, a bromine atom and a lower alkyl radical, and $X_5$ is a member selected from the group consisting of a hydrogen atom, a chlorine atom and a bromine atom.

2. Polyamide fibers containing as an agent for the protection against ultraviolet rays a small quantity of a compound of the formula

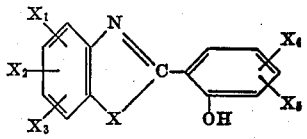

wherein X is a member selected from the group consisting of an oxygen atom, a sulfur atom and the —NH— group, $X_1$ is a member selected from the group consisting of a hydrogen atom, a chlorine atom and a lower alkyl radical, $X_2$ and $X_3$ each represent a member selected from the group consisting of a hydrogen atom and a chlorine atom, $X_4$ is a member selected from the group consisting of a hydrogen atom, a chlorine atom, a bromine atom and a lower alkyl radical, and $X_5$ is a member selected from the group consisting of a hydrogen atom, a chlorine atom and a bromine atom.

3. Process for protecting polyamide fibers against ultraviolet radiation with enhancement of resistance to loss in breaking strength of such fibers, which comprises incorporating with the polyamide before the shaping procedure the benzimidazole compound of the formula

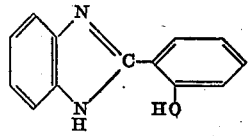

4. Process for protecting polyamide fibers against ultraviolet radiation with enhancement of resistance to loss in breaking strength of such fibers, which comprises incorporating with the polyamide before the shaping procedure the benzimidazole compound of the formula

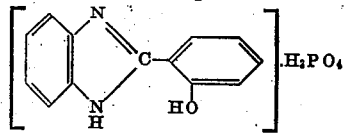

5. Process for protecting polyamide fibers against ultraviolet radiation with enhancement of resistance to loss in breaking strength of such fibers, which comprises incorporating with the polyamide before the shaping procedure the benzimidazole compound of the formula

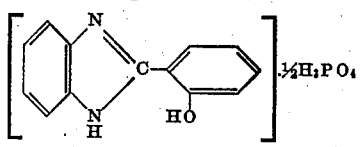

6. Process for protecting polyamide fibers against ultraviolet radiation with enhancement of resistance to loss in breaking strength of such fibers, which comprises incorporating with the polyamide before the shaping procedure the benzimidazole compound of the formula

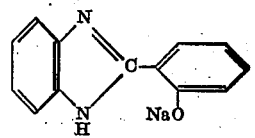

7. Polyamide fibers containing as an agent for the protection against ultraviolet rays a small quantity of the benzimidazole compound of the formula

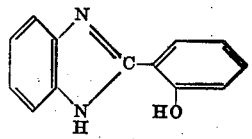

8. Polyamide fibers containing as an agent for the protection against ultraviolet rays a small quantity of the benzimidazole compound of the formula

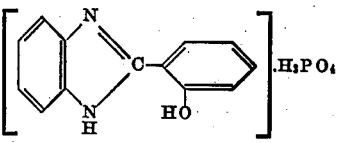

9. Polyamide fibers containing as an agent for the protection against ultraviolet rays a small quantity of the benzimidazole compound of the formula

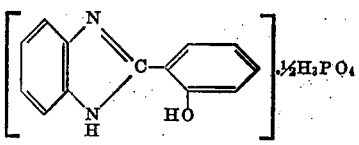

10. Polyamide fibers containing as an agent for the protection against ultraviolet rays a small quantity of the benzimidazole compound of the formula

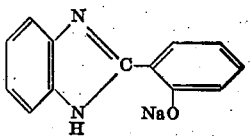

References Cited in the file of this patent

UNITED STATES PATENTS

| | | |
|---|---|---|
| 2,616,893 | Newby | Nov. 4, 1952 |
| 2,630,421 | Stamatoff | Mar. 3, 1953 |
| 2,754,216 | Chenicek | July 10, 1956 |

UNITED STATES PATENT OFFICE
CERTIFICATION OF CORRECTION

Patent No. 2,995,540 August 8, 1961

Max Duennenberger et al.

It is hereby certified that error appears in the above numbered patent requiring correction and that the said Letters Patent should read as corrected below.

Columns 7 and 8, in the table, the compound of item 15 should read as shown below instead of as in the patent:

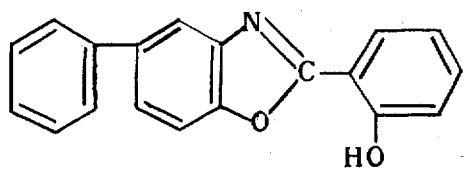

column 15, lines 29 to 33, the right-hand portion of the formula should appear as shown below instead of as in the patent:

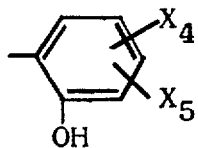

Signed and sealed this 3rd day of April 1962.

(SEAL)
Attest:

ERNEST W. SWIDER
Attesting Officer

DAVID L. LADD
Commissioner of Patents